US012305072B2

United States Patent
Fang et al.

(10) Patent No.: US 12,305,072 B2
(45) Date of Patent: May 20, 2025

(54) METHOD FOR TREATING SURFACE OF FLOOR

(71) Applicant: Zhejiang Tianzhen Technology Co., Ltd., Huzhou (CN)

(72) Inventors: Qinghua Fang, Zhejiang (CN); Wenjin Tang, Zhejiang (CN); Yin Yin, Zhejiang (CN); Jianying Xia, Zhejiang (CN)

(73) Assignee: Zhejiang Tianzhen Technology Co., Ltd., Zhejiang (CN)

( * ) Notice: Subject to any disclaimer, the term of this patent is extended or adjusted under 35 U.S.C. 154(b) by 38 days.

(21) Appl. No.: 17/841,097

(22) Filed: Jun. 15, 2022

(65) Prior Publication Data

US 2023/0203318 A1 Jun. 29, 2023

(30) Foreign Application Priority Data

Dec. 29, 2021 (CN) .......................... 202111641176.1

(51) Int. Cl.
*C09D 5/00* (2006.01)
*B05D 3/12* (2006.01)
(Continued)

(52) U.S. Cl.
CPC .............. *C09D 5/002* (2013.01); *B05D 3/12* (2013.01); *B05D 5/02* (2013.01); *B05D 7/58* (2013.01);
(Continued)

(58) Field of Classification Search
CPC ........ C09D 5/002; C09D 7/61; C09D 175/14; B05D 3/12; B05D 5/02; B05D 7/58;
(Continued)

(56) References Cited

U.S. PATENT DOCUMENTS

| 2003/0008974 A1* | 1/2003 | Mehnert | .................. C09C 3/12 |
| | | | 525/100 |
| 2006/0160915 A1* | 7/2006 | Fuchs | ...................... C08F 2/50 |
| | | | 522/6 |

(Continued)

FOREIGN PATENT DOCUMENTS

| CN | 102618163 A | * | 8/2012 |
| CN | 104960346 A | * | 10/2015 |
| CN | 109955341 A | * | 7/2019 |

OTHER PUBLICATIONS

Translation CN104960346 (Year: 2015).*
Translation CN10955341 (Year: 2019).*
Translation CN102618163 (Year: 2012).*

*Primary Examiner* — Francisco W Tschen
(74) *Attorney, Agent, or Firm* — HUNTON ANDREWS KURTH LLP

(57) ABSTRACT

The disclosure belongs to the technical field of floor preparation, and provides a method for treating a surface of a floor. Compared with traditional methods for preparing floor, in the method according to the disclosure, an embossing is performed not directly after laminating, but after applying a wear-resistant primer, and a topcoat is then applied. Therefore, the resulting embossed floor has a clear texture. Further, the composition of the wear-resistant primer could be optimized, such that the resulting embossed floor exhibits excellent wear resistance and hardness.

9 Claims, 4 Drawing Sheets

(51) Int. Cl.
  *B05D 5/02*    (2006.01)
  *B05D 7/00*    (2006.01)
  *C09D 7/61*    (2018.01)
  *C09D 175/14*  (2006.01)
  *E04F 15/10*   (2006.01)

(52) U.S. Cl.
  CPC ............ *C09D 7/61* (2018.01); *C09D 175/14* (2013.01); *E04F 15/107* (2013.01)

(58) Field of Classification Search
  CPC ........ B05D 2203/20; B05D 7/02; B05D 7/57; E04F 15/107; B27M 3/04; B27M 1/02; B27K 3/52
  See application file for complete search history.

(56) References Cited

U.S. PATENT DOCUMENTS

| | | | | |
|---|---|---|---|---|
| 2007/0275169 | A1* | 11/2007 | Pohlmann | B27M 1/003 |
| | | | | 427/355 |
| 2008/0206583 | A1* | 8/2008 | Phan | C08L 23/10 |
| | | | | 264/211.21 |
| 2016/0102464 | A1* | 4/2016 | Ehlers | E04F 15/16 |
| | | | | 428/44 |
| 2019/0211571 | A1* | 7/2019 | Van Vlassenrode | B32B 38/06 |
| 2020/0172736 | A1* | 6/2020 | Chen | B32B 27/30 |

* cited by examiner

METHOD FOR TREATING SURFACE OF FLOOR

CROSS REFERENCE TO RELATED APPLICATION

This patent application claims the benefit and priority of Chinese Patent Application No. 202111641176.1, entitled "Method for treating surface of floor" filed on Dec. 29, 2021, the disclosure of which is incorporated by reference herein in its entirety as part of the present application.

TECHNICAL FIELD

The present disclosure relates to the technical field of floor preparation, in particular to a method for treating a surface of a floor.

BACKGROUND ART

Since the floor first has arisen, it is common to set a wear-resistant layer on the outermost side of the floor to improve the wear resistance of the floor, but the setting of the wear-resistant layer would result in reduced hardness, which limits the application of the floor.

In order to solve the problem of low hardness, the wear-resistant layer is replaced with a UV layer; that is to say, after laminating and embossing, the UV coating is applied by roll coating to achieve the wear-resistant performance. Due to the large amount of the UV coating applied, the texture and embossing effect are greatly reduced after applying the UV coating by roll coating, which adversely affects the appearance of the floor. After applying the coating, the surface texture is filled with UV coating, which greatly reduces the three-dimensional effect of the texture and adversely affects the appearance of the overall product.

SUMMARY

In view of this, an object of the present disclosure is to provide a method for treating a surface of a floor, which enables that the obtained embossed floor has a clear texture, and meanwhile exhibits excellent wear resistance and hardness.

In order to achieve the above-mentioned object of the disclosure, the present disclosure provides the following technical solutions:

Provided is a method for treating a surface of a floor, comprising steps of applying a wear-resistant primer and a leveling primer in sequence onto a blank floor, to obtain a precursor plate; and subjecting the precursor plate to an embossing, and applying a topcoat thereon, to obtain an embossed floor.

In some embodiments, the blank floor comprises at least one selected from the group consisting of a stone plastic composites (SPC) floor, a polyvinyl chloride (PVC) foamed floor, and a wooden floor.

In some embodiments, the wear-resistant primer comprises, in percentages by mass, 40-60% of polyurethane acrylate, 20-30% of 1,6-hexamethylene diacrylate, 10-30% of aluminum oxide, 2-6% of a photoinitiator, and 0.1-2% of silica.

In some embodiments, the wear-resistant primer is applied in an amount of not less than 40 g/m$^2$.

In some embodiments, the leveling primer comprises, in percentages by mass, 50-60% of polyurethane acrylate, 30-50% of 1,6-hexamethylene diacrylate, 2-4% of a photoinitiator, and 0.1-1.0% of silica.

In some embodiments, the leveling primer is applied in an amount of 35-45 g/m$^2$.

In some embodiments, the leveling primer is replaced with a sanding coating, wherein the sanding coating comprises, in percentages by mass, 35-40% of polyurethane acrylate, 35-45% of tri(propylene glycol) diacrylate, 10-15% of ethoxylated trimethylolpropane triacrylate, 2-5% of a photoinitiator, and 5-10% of talc.

In some embodiments, the sanding coating is applied in an amount of 35-45 g/m$^2$.

In some embodiments, the embossing is performed at a temperature of 160-220° C.

In some embodiments, the topcoat is is applied in an amount of not less than 7 g/m$^2$.

Provided is a method for treating a surface of a floor, which comprises steps of applying a wear-resistant primer and a leveling primer in sequence onto a blank floor, to obtain a precursor plate; subjecting the precursor plate to an embossing, and applying a topcoat thereon, to obtain an embossed floor.

Compared with traditional methods for preparing floors, in the method according to the present disclosure, an embossing is performed not directly after laminating but after applying a wear-resistant primer, and a topcoat is then applied. Therefore, only a topcoat is applied after the embossing, and thus the resulting embossed pattern has a clear and three-dimensional texture.

Further, in the present disclosure, the composition of the wear-resistant primer and the leveling primer could be optimized, such that the wear-resistant primer and the leveling primer could withstand the pressure for embossing. That is to say, they would not be broken due to the pressure for embossing. Further, the composition of the wear-resistant primer could be optimized such that the wear-resistant primer layer exhibits excellent wear resistance and hardness, thereby imparting excellent wear resistance and hardness to the floor.

DETAILED DESCRIPTION OF THE EMBODIMENTS

Figure 1:
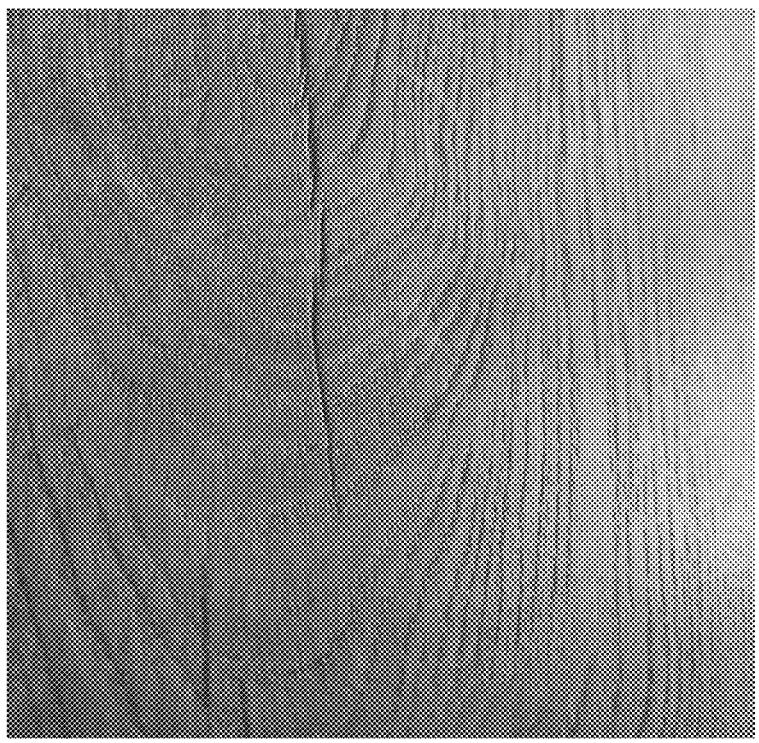
FIG. 1 is a photography of real object of the embossed floor obtained in Example 1.

The present disclosure provides a method for treating a surface of a floor, comprising steps of applying a wear-resistant primer and a leveling primer in sequence onto a blank floor, to obtain a precursor plate; and subjecting the precursor plate to an embossing, and applying a topcoat thereon, to obtain an embossed floor.

In the present disclosure, unless otherwise specified, the raw materials used in the present disclosure are preferably commercially available products.

In the present disclosure, the wear-resistant primer and the leveling primer are sequentially applied onto a blank floor, to obtain a precursor plate.

In some embodiments of the present disclosure, the blank floor comprises at least one selected from the group consisting of a SPC floor, a PVC foamed floor, and a wooden floor, and preferably a SPC floor.

In some embodiments of the present disclosure, the wear-resistant primer comprises, in percentages by mass, 40-60% of polyurethane acrylate, 20-30% of 1,6-hexamethylene diacrylate, 10-30% of aluminum oxide, 2-6% of a photoinitiator, and 0.1-2% of silica.

In some embodiments of the present disclosure, the wear-resistant primer comprises 40-60% by mass of polyurethane acrylate, preferably 45-55%, and more preferably 50.5%. In some embodiments of the present disclosure, the polyurethane acrylate has a CAS No. of 68987-79-1.

In some embodiments of the present disclosure, the wear-resistant primer comprises 20-30% by mass of 1,6-hexamethylene diacrylate, preferably 22-28%, and more preferably 25%. In some embodiments of the present disclosure, the 1,6-hexamethylene diacrylate has a CAS No. of 13048-33-4.

In some embodiments of the present disclosure, the wear-resistant primer comprises 10-30% by mass of aluminum oxide, preferably 15-25%, and more preferably 20%. In some embodiments of the present disclosure, the aluminum oxide has a particle size of 30-50 μm. In some embodiments of the present disclosure, the aluminum oxide has a CAS No. of 1344-28-1.

In some embodiments of the present disclosure, the wear-resistant primer comprises 2-6% by mass of a photoinitiator, preferably 3-5%, and more preferably 4%. In some embodiments of the present disclosure, the photoinitiator is 1-hydroxycyclohexyl phenyl ketone. In some embodiments, and the photoinitiator has a CAS No. of 947-19-3.

In some embodiments of the present disclosure, the wear-resistant primer comprises 0.1-2% by mass of silica, preferably 0.2-1.5%, and more preferably 0.5-1.0%. In some embodiments of the present disclosure, the silica has a particle size of 6-8 μm. In some embodiments of the present disclosure, the silica has a CAS No. of 112926-00-8.

In some embodiments of the present disclosure, the wear-resistant primer is applied in an amount of not less than 40 g/m², and preferably 40-100 g/m².

In some embodiments of the present disclosure, the wear-resistant primer is applied for at least one times, and preferably 2-5 times.

In some embodiments of the present disclosure, the composition of the wear-resistant primer is optimized such that it could withstand the pressure for the subsequent embossing, so as to prevent the wear-resistant primer from breaking and deforming during the embossing. Further, the optimization of the composition of the wear-resistant primer impart excellent wear resistance and hardness to the floor.

In some embodiments of the present disclosure, the leveling primer comprises, in percentages by mass, 50-60% of polyurethane acrylate, 30-50% of 1,6-hexamethylene diacrylate, 2-4% of a photoinitiator, and 0.1-1.0% of silica.

In some embodiments of the present disclosure, the leveling primer comprises 50-60% by mass of polyurethane acrylate, preferably 52-58%, and more preferably 56.5%. In some embodiments of the present disclosure, the polyurethane acrylate has a CAS No. of 68987-79-1.

In some embodiments of the present disclosure, the leveling primer comprises 30-50% by mass of 1,6-hexamethylene diacrylate, preferably 35-45%, and more preferably 40%. In some embodiments of the present disclosure, the 1,6-hexamethylene diacrylate has a CAS No. of 13048-33-4.

In some embodiments of the present disclosure, the leveling primer comprises 2-4% by mass of a photoinitiator, preferably 2.5-3.5%, and more preferably 3%. In some embodiments of the present disclosure, the photoinitiator is 1-hydroxycyclohexyl phenyl ketone. In some embodiments, the photoinitiator has a CAS No. of 947-19-3.

In some embodiments of the present disclosure, the leveling primer comprises 0.1-1.0% by mass of silica, preferably 0.2-0.8%, and more preferably 0.5-0.6%. In some embodiments of the present disclosure, the silica has a particle size of 6-8 μm. In some embodiments of the present disclosure, the silica has a CAS No. of 112926-00-8.

In some embodiments of the present disclosure, the leveling primer is applied in an amount of 35-45 g/m², and preferably 40 g/m².

In some embodiments of the present disclosure, as an alternative, the leveling primer is replaced with a sanding coating.

In some embodiments of the present disclosure, the sanding coating comprises in percentages by mass, 35-40% of polyurethane acrylate, 35-45% of tri(propylene glycol) diacrylate, 10-15% of ethoxylated trimethylolpropane triacrylate, 2-5% of a photoinitiator, and 5-10% of talc.

In some embodiments of the present disclosure, the sanding coating comprises 35-40% by mass of polyurethane acrylate, preferably 36-39%, and more preferably 37-38%. In some embodiments of the present disclosure, the polyurethane acrylate has a CAS No. of 68987-79-1.

In some embodiments of the present disclosure, the sanding coating comprises 35-45% by mass of tri(propylene glycol) diacrylate, preferably 37-43%, and more preferably 40%. In some embodiments of the present disclosure, the tri(propylene glycol) diacrylate has a CAS No. of 42978-66-5.

In some embodiments of the present disclosure, the sanding coating comprises 10-15% by mass of ethoxylated trimethylolpropane triacrylate, and preferably 11-14%.

In some embodiments of the present disclosure, the ethoxylated trimethylolpropane triacrylate has a CAS No. of 28961-43-5.

In some embodiments of the present disclosure, the sanding coating comprises 2-5% by mass of a photoinitiator, and preferably 3-4%. In some embodiments of the present disclosure, the photoinitiator has a CAS No. of 947-19-3.

In some embodiments of the present disclosure, the sanding coating comprises 5-10% by mass of talc, preferably 6-9'%, and more preferably 7-8%. In some embodiments of the present disclosure, the talc has a CAS No. of 14807-96-6.

In some embodiments of the present disclosure, the sanding coating is applied in an amount of 35-45 g/m².

In the present disclosure, after the precursor plate is obtained, the precursor plate is subjected to an embossing, and a topcoat is then applied thereon, to obtain an embossed floor.

In some embodiments of the present disclosure, the embossing is performed at a temperature of 160-220° C.

In some embodiments of the present disclosure, the topcoat comprises, in percentages by mass, 25-30% of polyurethane acrylate, 45-50% of 1,6-hexamethylene diacrylate, 5-10% of aluminum oxide, 1-5% of a photoinitiator, and 5-15% of silica.

In some embodiments of the present disclosure, the topcoat comprises 25-30% by mass of polyurethane acrylate, preferably 26-29%, and more preferably 27-28%. In some embodiments of the present disclosure, the polyurethane acrylate has a CAS No. of 68987-79-1.

In some embodiments of the present disclosure, the topcoat comprises 45-50% by mass of 1,6-hexamethylene diacrylate, preferably 46-49%, and more preferably 47-48.5%. In some embodiments of the present disclosure, the 1,6-hexamethylene diacrylate has a CAS No. of 13048-33-4.

In some embodiments of the present disclosure, the topcoat comprises 5-10% by mass of aluminum oxide, preferably 6-9%, and more preferably 7-8%. In some embodiments of the present disclosure, the aluminum oxide has a particle size of 30-50 μm. In some embodiments, the aluminum oxide has a CAS No. of 1344-28-1.

In some embodiments of the present disclosure, the topcoat comprises 1-5% by mass of a photoinitiator, preferably 2-4%, and more preferably 3-3.5%. In some embodiments of the present disclosure, the photoinitiator has a CAS No. of 947-19-3.

In some embodiments of the present disclosure, the topcoat comprises 5-15% by mass of silica, preferably 7-13%, and more preferably 10%. In some embodiments of the present disclosure, the silica has a particle size of 6-8 μm. In some embodiments of the present disclosure, the silica has a CAS No. of 7631-86-9.

In some embodiments of the present disclosure, the topcoat is applied in an amount of not less than 7 g/m$^2$, and preferably 7-15 g/m$^2$.

In some embodiments of the present disclosure, the topcoat is applied for at least one times, and preferably twice.

The method for treating a surface of a floor according to the present disclosure will be described in detail below with reference to the examples. However, the examples should not be construed as limiting the scope of the present disclosure.

Example 1

A wear-resistant primer and a leveling primer were sequentially applied onto a SPC blank floor, obtaining a precursor plate.

The wear-resistant primer consisted of the following components, in percentages by mass: 50.5% of polyurethane acrylate (68987-79-1), 25% of 1,6-hexamethylene diacrylate (13048-33-4), 20% of aluminum oxide (1344-28-1), 4% of the photoinitiator (947-19-3), and 0.5% of silica (112926-00-8). The wear-resistant primer was applied in three times, each in an amount of 30 g/m$^2$.

The leveling primer consisted of the following components, in percentages by mass: 56.5% of polyurethane acrylate (68987-79-1), 40% of 1,6-hexamethylene diacrylate (13048-33-4), 3% of the photoinitiator (947-19-3), and 0.5% of silica (112926-00-8). The leveling primer was applied once, in an amount of 40 g/m$^2$.

After the precursor plate was obtained, the precursor plate was subjected to an embossing treatment, and a topcoat was then applied thereon, obtaining an embossed floor.

The embossing was performed at a temperature of 200° C.

The topcoat consisted of the following components, in percentages by mass: 29% of polyurethane acrylate (68987-79-1), 48.5% of 1,6-hexamethylene diacrylate (13048-33-4), 9% of aluminum oxide (1344-28-1), 3.5% of the photoinitiator (947-19-3), and 10% of silica (7631-86-9). The topcoat was applied in 2 times, a first application in an amount of 7 g/m$^2$, and a second application in an amount of 8 g/m$^2$.

FIG. 1 is a photography of real object of the embossed floor obtained in Example 1.

Example 2

A wear-resistant primer and a sanding coating were applied in sequence onto a SPC blank floor, obtaining a precursor plate.

The wear-resistant primer consisted of the following components, in percentages by mass: 50.5% of polyurethane acrylate (68987-79-1), 25% of 1,6-hexamethylene diacrylate (13048-33-4), 20% of aluminum oxide (1344-28-1), 4% of the photoinitiator (947-19-3), and 0.5% of silicon dioxide (112926-00-8). The wear-resistant primer was applied twice, each in an amount of 20 g/m$^2$.

The sanding coating consisted of the following components, in percentages by mass: 38% of polyurethane acrylate (68987-79-1), 40% of tri(propylene glycol) diacrylate (42978-66-5), 11% of ethoxylated trimethylolpropane triacrylate (28961-43-5), 3% of the photoinitiator (947-19-3), and 8% of talc (14807-96-6). The sanding coating was applied once, in an amount of 40 g/m$^2$.

After the precursor plate was obtained, the precursor plate was subjected to an embossing, and a topcoat was then applied thereon, obtaining an embossed floor.

The embossing was performed at a temperature of 190° C.

The topcoat consisted of the following components, in percentages by mass: 29% of polyurethane acrylate (68987-79-1), 48.5% of 1,6-hexamethylene diacrylate (13048-33-4), 9% of aluminum oxide (1344-28-1), 3.5% of the photoinitiator (947-19-3), and 10% of silica (7631-86-9). The topcoat was applied twice, each in an amount of 7 g/m$^2$.

Figure 2:
FIG. 2 is a photography of real object of the embossed floor obtained in Example 2.

FIG. 2 is a photography of real object of the embossed floor obtained in Example 2.

Example 3

A wear-resistant primer and a leveling primer were applied sequentially onto a SPC blank floor, obtaining a precursor plate.

The wear-resistant primer consisted of the following components, in percentages by mass: 50.5% of polyurethane acrylate (68987-79-1), 25% of 1,6-hexamethylene diacrylate (13048-334), 20% of aluminum oxide (1344-28-1), 4% of the photoinitiator (947-19-3), and 0.5% of silicon dioxide (112926-00-8). The wear-resistant primer was applied once, in an amount of 40 g/m$^2$.

The leveling primer consisted of the following components, in percentages by mass: 56.5% of polyurethane acrylate (68987-79-1), 40% of 1,6-hexamethylene diacrylate (13048-33-4), 3% of the photoinitiator (947-19-3), and 0.5% of silicon dioxide (112926-00-8). The leveling primer was applied once, in an amount of 40 g/m$^2$.

After the precursor plate was obtained, the precursor plate was subjected to an embossing and a topcoat was then applied, obtaining an embossed floor.

The embossing was performed at a temperature of 210° C.

The topcoat consisted of the following components, in percentages by mass: 29% of polyurethane acrylate (68987-79-1), 48.5% of 1,6-hexamethylene diacrylate (13048-334), 9% of aluminum oxide (1344-28-1), 3.5% of the photoinitiator (947-19-3), and 10% of silica (7631-86-9). The topcoat was applied twice, a first application in an amount of 7 g/m$^2$, and a second application in an amount of 8 g/m$^2$.

Figure 3:
FIG. 3 is a photography of real object of the embossed floor obtained in Example 3.

FIG. 3 is a photography of real object of the embossed floor obtained in Example 3.

Example 4

A wear-resistant primer and a sanding coating were applied in sequence onto a SPC blank floor, obtaining a precursor plate.

The wear-resistant primer consisted of the following components, in percentages by mass: 50.5% of polyurethane acrylate (68987-79-1), 25% of 1,6-hexamethylene diacrylate (13048-334), 20% of aluminum oxide (1344-28-1), 4% of the photoinitiator (947-19-3), and 0.5% of silica (112926-00-8). The wear-resistant primer was applied in three times, each in an amount of 25 g/m².

The sanding coating consisted of the following components, in percentages by mass: 38% of polyurethane acrylate (68987-79-1), 40% of tri(propylene glycol) diacrylate (42978-66-5), 11% of ethoxylated trimethylolpropane triacrylate (28961-43-5), 3% of the photoinitiator (947-19-3), 8% of talc (14807-96-6). The sanding coating was applied once in an amount of 40 g/m².

After the precursor plate was obtained, the precursor plate was subjected to an embossing and a topcoat was then applied thereon, obtaining an embossed floor.

The embossing was performed at a temperature of 160° C.

The topcoat consisted of the following components in percentages by mass: 29% of polyurethane acrylate (68987-79-1), 48.5% of 1,6-hexamethylene diacrylate (13048-33-4), 9% of aluminum oxide (1344-28-1), 3.5% of the photoinitiator (947-19-3), and 10% of silica (7631-86-9). The topcoat was applied twice, a first application in an amount of 7 g/m², and a second application in an amount of 8 g/m².

Figure 4:
FIG. 4 is a photography of real object of the embossed floor obtained in Example 4.

FIG. 4 is a photography of real object of the embossed floor obtained in Example 4.

The wear resistance of the embossed floors obtained in Examples 1 to 4 and the floor purchased from JIANGSU KENTIER WOOD CO., LTD., CHINA was measured according to EN13329 method. The results are shown in Table 1.

The hardness of the embossed floors obtained in Examples 1 to 4 and the floor purchased from JIANGSU KENTIER WOOD CO., LTD., CHINA was measured according to ISO 1518 method. The results are shown in Table 1.

TABLE 1

The performance test results of the embossed floors obtained in Examples 1 to 4 and commercially available floor

|  | Example 1 | Example 2 | Example 3 | Example 4 | Commercially available floor |
|---|---|---|---|---|---|
| Abrasion resistance | 2600 r | 2800 r | 2780 r | 2580 r | 2000 r |
| Hardness | 23N | 22N | 25N | 24N | 10N |

As can be seen from Table 1, the embossed floors according to the present disclosure exhibit excellent hardness and wear resistance.

The above are only the preferred embodiments of the present disclosure. It should be pointed out that for those skilled in the art, without departing from the principles of the present disclosure, several improvements and modifications could be made. These improvements and modifications shall fall within the scope of the present disclosure.

What is claimed is:

1. A method for treating a surface of a floor, comprising steps of:
    applying a first primer and then a second primer onto a blank floor, or applying a first primer and then a first coating onto a blank floor, to obtain a precursor plate; and
    subjecting the precursor plate to an embossing, and applying a topcoat thereon, to obtain an embossed floor,
    wherein the first primer consists of, in percentages by mass, 40-60% of polyurethane acrylate, 20-30% of 1,6-hexamethylene diacrylate, 10-30% of aluminum oxide, 2-6% of a photoinitiator, and 0.1-2% of silica;
    wherein the second primer consists of, in percentages by mass, 50-60% of polyurethane acrylate, 30-50% of 1,6-hexamethylene diacrylate, 2-4% of a photoinitiator, and 0.1-1.0% of silica; and
    wherein the first coating consists of, in percentages by mass, 35-40% of polyurethane acrylate, 35-45% of tri (propylene glycol) diacrylate, 10-15% of ethoxylated trimethylolpropane triacrylate, 2-5% of a photoinitiator, and 5-10% of talc.

2. The method as claimed in claim 1, wherein the blank floor comprises at least one selected from the group consisting of a stone plastic composites floor, a polyvinyl chloride foamed floor, and a wooden floor.

3. The method as claimed in claim 1, wherein the first primer is applied in an amount of not less than 40 g/m².

4. The method as claimed in claim 1, wherein the second primer is applied in an amount of 35-45 g/m².

5. The method as claimed in claim 1, wherein the first coating is applied in an amount of 35-45 g/m².

6. The method as claimed in claim 1, wherein the embossing is performed at a temperature of 160-220° C.

7. The method as claimed in claim 1, wherein the topcoat is applied in an amount of not less than 7 g/m².

8. The method as claimed in claim 1, wherein the topcoat comprises, in percentages by mass, 25-30% of polyurethane acrylate, 45-50% of 1,6-hexamethylene diacrylate, 5-10% of aluminum oxide, 1-5% of a photoinitiator, and 5-15% of silica.

9. The method as claimed in claim 1, wherein the silica in the first primer and the silica in the second primer each independently have a particle size of 6-8 μm, and the aluminum oxide in the first primer has a particle size of 30-50 μm.

* * * * *